United States Patent
Kawashima et al.

(10) Patent No.: US 7,923,499 B2
(45) Date of Patent: Apr. 12, 2011

(54) CALCIUM CARBONATE TREATED WITH CURING ACTIVE INGREDIENT

(75) Inventors: Takahiro Kawashima, Amagasaki (JP); Shoichi Tsutsui, Osaka (JP)

(73) Assignee: Shiraishi Kogyo Kaisha, Ltd., Osaka (JP)

( * ) Notice: Subject to any disclaimer, the term of this patent is extended or adjusted under 35 U.S.C. 154(b) by 69 days.

(21) Appl. No.: 12/311,346

(22) PCT Filed: Sep. 26, 2007

(86) PCT No.: PCT/JP2007/068610
§ 371 (c)(1),
(2), (4) Date: Mar. 27, 2009

(87) PCT Pub. No.: WO2008/041568
PCT Pub. Date: Apr. 10, 2008

(65) Prior Publication Data
US 2009/0234055 A1 Sep. 17, 2009

(30) Foreign Application Priority Data

Sep. 28, 2006 (JP) .................................. 2006-265268

(51) Int. Cl.
*C08K 3/26* (2006.01)
*C08K 5/09* (2006.01)
(52) U.S. Cl. ....................................... 524/425; 524/301
(58) Field of Classification Search .................... 524/425
See application file for complete search history.

(56) References Cited

U.S. PATENT DOCUMENTS

2007/0293621 A1* 12/2007 Korenaga et al. ............. 524/543

FOREIGN PATENT DOCUMENTS

| JP | S56-104950 A | | 8/1981 |
| JP | 2005-048102 A | | 2/2005 |
| JP | 2005048102 A | * | 2/2005 |
| WO | 2004/009711 A1 | | 1/2004 |
| WO | 2006/025423 A1 | | 3/2006 |
| WO | 2006/077649 A1 | | 7/2006 |
| WO | WO 2006077649 A1 | * | 7/2006 |

OTHER PUBLICATIONS

Translation of JP 2005048102, Feb. 2005.*

* cited by examiner

*Primary Examiner* — Ling-Siu Choi
*Assistant Examiner* — Hui Chin
(74) *Attorney, Agent, or Firm* — Kubovcik & Kubovcik

(57) ABSTRACT

Disclosed is calcium carbonate treated with a curing active ingredient, which, when compounded in a rubber, enables to provide good workability (handling) to the rubber and maximize advantageous properties of the rubber attributable to calcium carbonate (e.g., slip resistance) without deteriorating the reinforcing property of the rubber. The calcium carbonated treated with a curing active ingredient is produced by mixing a modified calcium carbonate having its surface treated with a fatty acid or a resin acid and silicic acid and having an average primary particle diameter of 0.01 to 0.5 μm with a curing active ingredient which takes a liquid form at ambient temperature so that the content of the curing active ingredient in the finished product becomes 9.1 to 35 wt %.

7 Claims, No Drawings

CALCIUM CARBONATE TREATED WITH CURING ACTIVE INGREDIENT

This application is a 371 of international application PCT/JP2007/068610, filed Sep. 26, 2007, which claims priority based on Japanese patent application No. 2006-265268 filed Sep. 28, 2006, which is incorporated herein by reference.

TECHNICAL FIELD

The present invention relates to calcium carbonate treated with a curing active ingredient, which is obtained by mixing modified calcium carbonate with the curing active ingredient that is in liquid form at ambient temperature.

BACKGROUND ART

Calcium carbonate has been heretofore utilized in wide fields, such as of rubber, plastic, paint, ink, sealing medium, paper, pesticide, neutralizer, food additive and cosmetics. Among them, there is a method which utilizes calcium carbonate as a support (carrier) for liquid-form products as illustrated in Patent Literatures 1 and 2 to improve workability.

This method enables a higher concentration of a silane coupling agent or the like to be supported in a powder of calcium carbonate, either alone or in the form of a mixture with a high-liquid-absorptive inorganic filler. For example, in the case where a specific amount of a silane coupling agent or the like is incorporated in rubber, a handling property is improved. However, a limited loading makes it difficult to exhibit the effect of incorporating calcium carbonate.

On the other hand, Patent Literature 3 and others illustrate cases where the supported amount is small. If a specific amount of a silane coupling agent or the like is to be incorporated in rubber, a higher amount of the carrier must be loaded. This lowers a reinforcing property, for example.

Patent Literature 1: International Publication WO 2006/025423
Patent Literature 2: Japanese Paten Laid-Open No. Sho 56-104950
Patent Literature 3: International Publication WO 2004/009711

DISCLOSURE OF THE INVENTION

It is an object of the invention to provide calcium carbonate treated with a curing active ingredient, which, when incorporated in a rubber, enables the rubber to exhibit good processability (handling property) and the highest degrees of merits attributed to calcium carbonate, such as slip resistance and heat build-up resistance, without deteriorating a rubber reinforcing property.

The calcium carbonate treated with a curing active ingredient of the present invention is characterized in that it is obtained by mixing a curing active ingredient, which is in liquid form at ambient temperature, with a modified calcium carbonate having a surface treated with a fatty acid or resin acid and a silicic acid and having a mean primary particle size of 0.01-0.5 μm such that the curing active ingredient content is brought to 9.1-35% by weight.

Illustrative of the curing active ingredient in the present invention are organosilane, organotitanate and organoaluminate compounds.

EFFECTS OF THE INVENTION

In accordance with the present invention, the calcium carbonate, when incorporated in a rubber, for example, enables the rubber to exhibit good processability (handling property) and the highest degrees of merits attributed to calcium carbonate, such as slip resistance and heat build-up resistance, without deteriorating a rubber reinforcing property.

BEST MODE FOR CARRYING OUT THE INVENTION

The present invention is below described more specifically.

Modified Calcium Carbonate

The modified calcium carbonate for use in the present invention is prepared by treating a surface of raw calcium carbonate with silicic acid and at least one selected from the group consisting of fatty acids and resin acids.

The useful modified calcium carbonate has a structure wherein fatty acid, resin acid and silicic acid cover an entire or partial surface of a particle of raw or treated calcium carbonate. They need not cover the entire surface continuously. The treating order is not specified either.

Examples of calcium carbonates useful as a raw material for the modified calcium carbonate include known ground calcium carbonates and synthetic (precipitated) calcium carbonates.

Ground calcium carbonate can be prepared, for example, by dry or wet grinding a naturally-occurring calcium carbonate ore using a roller mill, high-speed tumbling mill (impact shearing mill), container-driven medium mill (ball mill), medium-stirring mill, planetary ball mill, jet mill or the like.

Synthetic (precipitated) calcium carbonate can be obtained by such known processes as a carbonation process, a $CaCl_2$-soda process and a lime-soda process. Illustrating the lime milk-carbon acid gas reaction process specifically, raw limestone is mixed and burned with coke, petroleum fuel (heavy oil, light oil), natural gas, LPG or the like to thereby provide quick lime. This quick lime is hydrated to provide a calcium hydroxide slurry which is subsequently bubbled and reacted with a carbon dioxide gas generated during the mixing and burning to thereby produce calcium carbonate. Fine particles of a desired submicron scale can be obtained by setting the conditions when the carbon dioxide gas is reacted.

A primary particle of the modified calcium carbonate in the present invention, a minimum unit thereof, is found to have a cubical or spherical shape when observed with a scanning electron microscope. Accordingly, a primary particle size of the modified calcium carbonate in the present invention can be measured by a scanning electron microscope and is preferably about 0.01-0.5 μm, more preferably about 0.01-0.1 μm.

The primary particle size of the modified calcium carbonate in the present invention indicates a length of its side if cubical or its diameter if spherical. The modified calcium carbonate in the present invention may take the form of a secondary particle as a result of agglomeration of such primary particles.

If the particle is excessively large, it may fail to hold the curing active ingredient sufficiently and deteriorate reinforcing properties such as modulus and abrasion resistance, which is not desirable. On the other hand, if the particle is excessively small, it may become less dispersible and fail to provide a reinforcing effect to a rubber component, which is not desirable either.

In the present invention, the fatty acid for use in the preparation of the modified calcium carbonate encompasses saturated or unsaturated fatty acids having a carbon number of about 6-24, and their salts and esters.

Examples of preferred saturated or unsaturated fatty acids having a carbon number of about 6-24 include stearic acid, palmitic acid, lauric acid, behenic acid, oleic acid, erucic acid and linoleic acid. Particularly preferred among them are stearic acid, palmitic acid, lauric acid and oleic acid. Two or more of them may be used in combination.

Examples of fatty acid salts include alkali metal salts and alkaline-earth metal salts.

Examples of fatty acid esters include esters of saturated or unsaturated fatty acids having a carbon number of about 6-24 and lower alcohols having a carbon number of about 6-18.

A treatment of calcium carbonate using the fatty acid can be carried out, for example, by methods which follow.

Firstly, the fatty acid is heated in an aqueous alkali metal solution such as an aqueous NaOH or KOH solution, during which the fatty acid is saponified (formed into a metal salt such as an Na or K salt) and rendered into a liquid form. Secondly, an aqueous suspension of calcium carbonate having a silica layer is preheated to 30-50° C. The above-obtained liquid-form fatty acid soap is added to this suspension. The resultant is then mixed by stirring to form a fatty acid layer. In the case where a soap such as a fatty acid Na is used directly, a preheated aqueous solution may be prepared and the above-described method is followed to carry out the treatment.

Alternatively, the treatment can be carried out without subjecting the fatty acid to saponification. For example, parent calcium carbonate is stirred while heated to a melting point of the fatty acid or above. After addition of the fatty acid, the resulting mixture is mixed by stirring. This results in the formation of a fatty acid layer.

Examples of resin acids for use in the present invention include abietic acids such as abietic acid, dehydroabietic acid, dihydroabietic acid and their polymers; diproportionated rosin, hydrogenated rosin, polymerized rosin, and their salts (e.g., alkaline metal salts and alkaline earth metal salts) and esters; and the like. Preferred among them are abietic acid and dehydroabietic acid.

The treatment using the resin acid can be achieved by the same methods as applied to the fatty acid. Specifically, the resin acid is heated in an aqueous alkali metal solution such as an aqueous NaOH or KOH solution, during which the resin acid is saponified (formed into a metal salt such as an Na or K salt) and rendered into a liquid form. Subsequently, the above-obtained liquid-form resin acid soap is added to an aqueous suspension of calcium carbonate having a silica layer and previously heated to 30-50° C. The mixture is then mixed by stirring to form a resin acid layer. In the case where a soap such as a resin acid Na is used directly, a preheated aqueous solution is prepared and then the above method is followed to carry out the treatment. The treatment can alternatively be carried out without subjecting the resin acid to saponification. For example, parent calcium carbonate is stirred while heated to a melting point of the resin acid or above. After addition of the resin acid, the resulting mixture is mixed by stirring. This results in the formation of a resin acid layer.

Although not particularly limited, the adhering amount of at least one organic acid selected from the group consisting of fatty and resin acids and constituting an organic acid layer is generally in the approximate range of 0.5-20 parts by weight, more preferably 1-15 parts by weight, further preferably 2-12 parts by weight, based on 100 parts by weight of calcium carbonate as a raw material.

The silicic acid for use in the preparation of the modified calcium carbonate in the present invention can be produced by any known method. Silica hydrosol produced by an acid decomposition method is illustrative thereof. For example, noncrystalline silica hydrosol is useful and can be produced by adding to a solution of sodium silicate an acidic material, examples of which include inorganic acids such as hydrochloric acid and sulfuric acid, aluminum sulfate, organic acids such as acetic acid and acrylic acid, carbonic acid gas and others. Useful silica hydrosol can alternatively be produced by a dialysis method wherein sodium silicate is passed through a semipermeable membrane or by an ion-exchange method using an ion-exchange resin.

A treatment of calcium carbonate using the silicic acid can be carried out, for example, by a method which involves adding an appropriate concentration of sodium silicate to a calcium carbonate slurry and dropping an acidic material such as an inorganic or organic acid to this mixture under stirring so that a surface of calcium carbonate is treated by the active silica hydrosol produced.

In the case where ready-made silica hydrosol is used, the treatment can be carried out by adding this silica hydrosol to a calcium carbonate slurry and then applying strong stirring.

In the present invention, the amount of silicic acid that adheres to calcium carbonate is not particularly specified. However, it is generally in the approximate range of 0.5-15 parts by weight, more preferably 1-12 parts by weight, further preferably 2-10 parts by weight, based on 100 parts by weight of calcium carbonate as a raw material. The adhering amount of silicic acid is suitably controlled depending upon the BET specific surface area or others of calcium carbonate which is subjected to adhesion.

If the amount of silicic acid that adheres to calcium carbonate is excessively small, the reaction site sufficient to couple the below-described curing active ingredient such as a silane coupling agent may decrease to result in the failure to exhibit desired rubber properties. On the other hand, if the adhering amount is excessively large, an excess amount of silica hydrosol or the like may be left unadhered to calcium carbonate surfaces and allowed to remain in the solution. When dried, such silica hydrosol or the like causes more calcium carbonate to agglomerate firmly and solidify to thereby increase coarse particles that are unsusceptible to comminution. Calcium carbonate fillers containing such coarse particles possibly deteriorate tearing strength, flex crack resistance and other properties of a polymer.

A mean particle size of the modified calcium carbonate for use in the present invention can be established within a range that provides a desired effect, but is preferably 0.01-0.5 μm, more preferably 0.01-0.3 μm, further preferably 0.01-0.1 μm, when observed with a scanning electron microscope.

If the particle size is excessively large, a rubber composition having sufficient abrasion resistance may not be obtained, which is not desirable. On the other hand, if the particle size is excessively small, dispersibility may decrease to reduce its reinforcing effect to a rubber component, which is not desirable either.

A BET specific surface area of the modified calcium carbonate is preferably about 5-120 $m^2/g$, more preferably about 10-120 $m^2/g$, further preferably about 60-110 $m^2/g$.

If the BET specific surface area is less than 5 $m^2/g$, sufficient abrasion resistance may not be obtained, which is not desirable. If it is greater than 120 $m^2/g$, dustability may become very high, which is not desirable either.

In the present invention, the sequence of a surface treatment using the fatty or resin acid and a surface treatment using the silicic acid is not particularly specified. It is however preferred that raw (i.e., untreated) calcium carbonate be treated at its surface firstly with the silicic acid and secondly with the fatty or resin acid.

Curing Active Ingredient

The curing active ingredient for use in the present invention is not particularly specified, so long as it serves as a cure activator in rubber or the like. Examples include organosilane, organotitanate and organoaluminate compounds. Other useful ingredients or components include known cure accelerators and accelerator activators. These may be used alone or in any combination.

Examples of useful organosilane compounds are those known as silane coupling agents. Examples of silane coupling agents include vinyltrichlorosilane, vinyltrimethoxysilane, vinyltriethoxysilane, vinyltris(β-methoxyethoxy)silane, β-(3,4-epoxycyclohexyl)ethyltrimethoxysilane, γ-(2-aminoethyl)aminopropyltrimethoxysilane, γ-glycidoxypropyltrimethoxysilane, γ-glycidoxypropylmethyldiethoxysilane, γ-glycidoxypropyltriethoxysilane, γ-methacryloxypropylmethyldimethoxysilane, γ-methacryloxypropyltrimethoxysilane, γ-methacryloxypropylmethyldiethoxysilane, γ-methacryloxypropyltriethoxysilane, N-β(aminoethyl)γ-aminopropylmethyldimethoxysilane, N-β(aminoethyl)γ-aminopropyltrimethoxysilane, N-β(aminoethyl)γ-aminopropyltriethoxysilane, γ-aminopropyltrimethoxysilane, γ-aminopropyltriethoxysilane, N-phenyl-γ-aminopropyltrimethoxysilane, γ-chloropropyltrimethoxysilane, γ-mercaptopropyltrimethoxysilane, bis-(3-[triethoxysilyl]-propyl)-disufane and bis-(3-[triethoxysilyl]-propyl)-tetrasufane (TESPT). These may be used alone or in combination.

Preferably used among them are γ-(2-aminoethyl)aminopropyltrimethoxysilane, N-β(aminoethyl)γ-aminopropyltrimethoxysilane, γ-mercaptopropyltrimethoxysilane and bis-(3-[triethoxysilyl]-propyl)-tetrasufane.

Any titanate coupling agent conventionally incorporated in rubbers and plastics can be loaded as the organotitanate compound, examples of which include isopropyltriisostearoyl titanate, isopropyltridodecylbenzenesulfonyl titanate, isopropyltris(dioctylpyrophosphate)titanate, tetraisopropylbis(dioctylphosphate)titanate, tetraoctylbis(ditridecylphophite) titanate, tetra(2,2-diallyloxymethyl-1-butyl)bis(ditridecyl) phosphite titanate, bis(dioctylpyrophosphate)oxyacetate titanate, bis(dioctylpyrophosphate)ethylene titanate, isopropyltrioctanoyl titanate, isopropyldimethacrylisostearoyl titanate, isopropylisostearoyldiacryl titanate, isopropyltri(dioctylphosphate)titanate, isopropyltricumylphenyl titanate, isopropyl-tri(N-amidoethyl.aminoethyl)titanate, dicumylphenyloxyacetate titanate and diisostearoylethylene titanate. These may be used alone or in combination. Preferred among them is isopropyltriisostearoyl titanate.

Useful as the organoaluminate compound is an aluminate coupling agent, illustrative of which is acetoalkoxyaluminum diisopropylate.

Silicic Acid and Silicic Acid Salt

Incorporated in rubber in the present invention, other than the modified calcium carbonate, is the silicic acid or silicic acid salt, examples of which include precipitated silica, fumed silica, colloidal silica, sol-gel process silica, fused silica, silica sand, cristobalite, kaolin clay, calcined clay, sericite, mica, talc and nepheline syenite. These may be used alone or in combination.

Preparation of Calcium Carbonate Treated with Curing Active Ingredient

The calcium carbonate composition incorporating the curing active ingredient of the present invention can be prepared by mixing the above-described modified calcium carbonate and the curing active ingredient. Although a mixing method is not particularly specified, a method is generally preferred which involves adding the liquid-form curing active ingredient to a powder of the modified calcium carbonate under the stirring to thereby achieve mixing thereof.

The curing active ingredient is contained in the amount of 9.1-35% by weight, preferably 9.1-30% by weight, more preferably 10-25% by weight, based on the whole (total weight of the modified calcium carbonate and curing active ingredient).

If the curing active ingredient content is below 9.1% by weight, a large amount of the calcium carbonate treated with the curing active ingredient must be incorporated in rubber or the like. This may deteriorate reinforcing properties or scorch stability. On the other hand, if the curing active ingredient content exceeds 35% by weight, it may become difficult to sustain a property of the powder.

Preparation of Rubber Composition

The calcium carbonate treated with the curing active ingredient of the present invention, particularly when incorporated in rubber, can provide the effect that improves slip resistance, permanent compression set and heat build-up resistance while sustaining abrasion resistance. Illustrative of such rubber are natural rubber, synthetic rubber and ethylene-vinyl acetate copolymer (EVA).

Useful as synthetic rubber is crosslinkable diene rubber. Specific examples of such synthetic rubbers include cis-1,4-polyisoprene, emulsion styrene-butadiene copolymer, solution styrene-butadiene copolymer, low cis-1,4-polybutadiene, high cis-1,4-polybutadiene, ethylene-propylene-diene copolymer, chloroprene, halogenated butyl rubber, acrylonitrile-butadiene rubber, butyl rubber, urethane rubber, silicone rubber, fluoro rubber, chlorosulfonyl polyethylene, epichlorohydrin rubber, and polysulfide rubber.

Particularly suitably used among the above-listed rubbers are natural rubber, cis-1,4-polyisoprene, emulsion styrene-butadiene copolymer, solution styrene-butadiene copolymer, low cis-1,4-polybutadiene and high cis-1,4-polybutadiene.

The above-listed natural and diene rubbers may be used alone or in combination. A mixing proportion may be suitably selected depending on the required properties and others.

The rubber composition of the present invention is obtained by loading silicic acid, silic acid salt and the above-described calcium carbonate treated with the curing active ingredient in a rubber component.

The silicic acid and silicic acid salt are generally loaded in the amount of 0.1-100 parts by weight, preferably 20-100 parts by weight, more preferably 20-90 parts by weight, based on 100 parts by weight of the rubber component.

The excessively low loading of the silicic acid and silicic acid salt undesirably lowers abrasion resistance of the rubber composition. On the other hand, the excessively high loading thereof increases a viscosity of rubber to undesirably lower workability.

The calcium carbonate treated with the curing active ingredient is loaded such that the curing active ingredient is preferably brought to the amount of 0.1-20 parts by weight, more preferably 0.5-20 parts by weight, further preferably 1-10 parts by weight, based on 100 parts by weight of the rubber composition.

The excessively low loading of the calcium carbonate treated with the curing active ingredient undesirably fails to improve the reinforcing properties when compounded with rubber. On the other hand, the excessively high loading thereof undesirably increases the cost of the rubber composition.

When necessary, other known ingredients can be further added to the rubber composition. For example, other fillers such as titanium oxide, precipitated barium sulfate, barite, aluminum hydroxide, magnesium hydroxide and carbon black can be used in suitable combination. Further, an additive such as process oil, antioxidant, age resister, activator, stearic acid, zinc oxide or wax, and a curing agent such as DCP, sulfur or cure accelerator can also be loaded when desired.

The rubber composition of the present invention can be produced by subjecting the rubber component, precipitated silica, the calcium carbonate treated with the curing active ingredient and other ingredients selected depending on the particular needs to mixing, warming up, extrusion, curing and others.

The mixing conditions are not particularly specified. The loading volume in a mixing apparatus, rotating speed of a rotar, ram pressure, mixing temperature, mixing time, type of the mixing apparatus and other mixing conditions can be suitably selected depending on the particular purposes. The mixing apparatus is not particularly limited and can be of either closed or open type. Examples are those generally known as useful for mixing of rubber compositions, including a Banbury mixer (registered trademark), Intermix (registered trademark), kneader and roll.

The warming conditions are not particularly limited. The warming temperature, warming time, warming equipment and other warming conditions can be suitably selected depending on the particular purposes. Illustrative of the warming equipment is a roller machine which is conventionally employed to warm rubber compositions.

The extrusion conditions are not particularly limited. The extrusion time, extrusion speed, extrusion equipment, extrusion temperature and other extrusion conditions can be suitably selected depending on the particular purposes. An example of the extrusion equipment is an extruder which is conventionally employed to extrude a rubber composition. The extrusion temperature can be suitably determined.

The curing equipment, system and conditions are not particularly limited and can be suitably selected depending on the particular purposes. Illustrative of the curing equipment is a molding and curing machine using a mold. As a curing condition, the curing temperature is generally 100-190° C.

EXAMPLES

The following examples specifically illustrate the present invention but are not intended to be limiting thereof.

[Preparation of Modified Calcium Carbonate]

A slurry of synthetic calcium carbonate having a BET specific surface area of 75 $m^2/g$ was heated while well stirred to 40° C. 7 parts by weight of a 10-fold dilution of sodium silicate (product of Wako Pure Chemical Industries, Ltd.) in water, based on 100 parts by weight of the synthetic calcium carbonate, was added at room temperature and dilute hydrochloric acid was introduced to form a silica layer on a surface of the calcium carbonate. Subsequently, 5 parts by weight of mixed fatty acid (oleic acid, stearic acid and palmitic acid (product of Wako Pure Chemical Industries, Ltd.)) was added which had been saponified by heating under stirring to 90° C., based on 100 parts by weight of the synthetic calcium carbonate. Then, dewatering, drying and grinding followed to obtain a calcium carbonate powder (mean primary particle size of 0.02 μm) having fatty acid layers. The obtained calcium carbonate powder is hereinafter referred to as modified calcium carbonate.

[Preparation of Calcium Carbonate Treated with Curing Active Ingredient]

The above-obtained modified calcium carbonate, the below-specified silica and silane coupling agent (TESPT) as the curing active ingredient were used to prepare calcium carbonate treated with curing active ingredient in the following manner.

Silane coupling agent: bis-(3-[triethoxysilyl]-propyl)tetrasulfone (TESPT), product of Degussa AG Silica: White carbon, oil absorption 200 ml/100 g, product name "Nipsil VN3", product of Nippon Silica Co., Ltd.

Calcium carbonate treated with curing active ingredient A (comparison)

The modified calcium carbonate as a powdery component was mixed under stirring in a Super mixer and further mixed under stirring while sprayed with the curing active ingredient so that the curing active ingredient content was brought to 1% by weight. The obtained calcium carbonate was designated as the calcium carbonate treated with curing active ingredient A.

Calcium Carbonate Treated with Curing Active Ingredient B (Present Invention)

The modified calcium carbonate as a powdery component was mixed under stirring in a Super mixer and further mixed under stirring while sprayed with the curing active ingredient so that the curing active ingredient content was brought to 10% by weight. The obtained calcium carbonate was designated as the calcium carbonate treated with curing active ingredient B.

Calcium Carbonate Treated with Curing Active Ingredient C (Present Invention)

The modified calcium carbonate as a powdery component was mixed under stirring in a Super mixer and further mixed under stirring while sprayed with the curing active ingredient so that the curing active ingredient content was brought to 20% by weight. The obtained calcium carbonate was designated as the calcium carbonate treated with curing active ingredient C.

Calcium Carbonate Treated with Curing Active Ingredient D (Present Invention)

The modified calcium carbonate as a powdery component was mixed under stirring in a Super mixer and further mixed under stirring while sprayed with the curing active ingredient so that the curing active ingredient content was brought to 30% by weight. The obtained calcium carbonate was designated as the calcium carbonate treated with curing active ingredient D.

Calcium Carbonate Treated with Curing Active Ingredient+Silica E (Comparison)

The modified calcium carbonate as a powdery component and silica in the ratio by weight of 90:10 were introduced in a Super mixer where they were mixed under stirring. They were further mixed under stirring while sprayed with the curing active ingredient so that the curing active ingredient content was brought to 50% by weight. The obtained calcium carbonate was designated as the calcium carbonate treated with curing active ingredient+silica E.

Calcium Carbonate Treated with Curing Active Ingredient F (Comparison)

The modified calcium carbonate as a powdery component was mixed under stirring in a Super mixer and further mixed under stirring while sprayed with the curing active ingredient so that the curing active ingredient content was brought to 50% by weight. The obtained calcium carbonate was designated as the calcium carbonate treated with curing active ingredient F.

[Preparation of Rubber Composition]

The above-obtained calcium carbonates treated with curing active ingredient were each blended with a rubber component to prepare a rubber composition. As the rubber component, the below-specified NBR, BR and NR were used. As other additives, zinc oxide, stearic acid, precipitated silica, age resister, PEG, Si69 (TESPT), cure accelerator DM, cure accelerator M, cure accelerator TS and sulfur were used. Specifically, the following are used as rubber chemicals.

In Table 1, the calcium carbonate treated with curing active ingredient, in terms of TESPT, is added in the amount of 1 part by weight, based on 100 parts by weight of rubber.

(Formulation of Rubber Composition)
NBR: 10 parts by weight
BR: 85 parts by weight
NR: 5 parts by weight
Zinc oxide: 5 parts by weight
Stearic acid: 1 part by weight
PEG: 5 parts by weight
Precipitated silica: as specified in Table 1
Si69: 1 part by weight
Age register: 1 part by weight
Cure accelerator DM: 1.5 parts by weight
Cure accelerator M: 0.3 parts by weight
Cure accelerator TS: 0.2 parts by weight
Sulfur: 2 parts by weight
Calcium carbonates treated with curing active ingredient A-E: as specified in Table 1
    NBR: medium-high nitrile content NBR, product name "Nipol 1042", acrylonitrile content 33%, product of Zeon Corporation
    BR: butadiene rubber, product name "BR01", product of JSR
    NR: SMR-L, standard Malaysian rubber
    Age resistor: product name "BHT", product of Ouchi Shinko Chemical Industrial Co., Ltd.
    Cure accelerator DM: product name "Nocceler DM", product of Ouchi Shinko Chemical Industrial Co., Ltd.
    Cure accelerator M: product name "Nocceler M", product of Ouchi Shinko Chemical Industrial Co., Ltd.
    Cure accelerator TS: product name "Nocceler TS", product of Ouchi Shinko Chemical Industrial Co., Ltd.
    PEG: product name "PEG 4000", product of Wako Pure Chemical Industries, Ltd., guaranteed reagent In Table 2, the calcium carbonate treated with curing active ingredient, in terms of TESPT, is added in the amount of 5 parts by weight, based on 100 parts by weight of rubber.

(Formulation of Rubber Composition)
S-SBR: 100 parts by weight
Zinc oxide: 4 parts by weight
Stearic acid: 2 parts by weight
PEG: 5 parts by weight
Precipitated silica: as specified in Table 2
Si69: 5 parts by weight
Age register: 1 part by weight
Cure accelerator D: 1 part by weight
Cure accelerator CZ: 1 part by weight
Sulfur: 2 parts by weight
Calcium carbonates treated with curing active ingredient B-E: as specified in Table 2
    S-SBR: solution polymerized SBR, product name "SL 552", product of JSR
    Cure accelerator D: product name "Nocceler D", product of Ouchi Shinko Chemical Industrial Co., Ltd.
    Cure accelerator CZ: product name "Nocceler CZ", product of Ouchi Shinko Chemical Industrial Co., Ltd.
    Naphthenic oil: product name "NP-24", product of Idemitsu Kosan Co., Ltd.

Mixing of the additives in the rubber component was achieved by using an 8-inch two rolls. The resulting rubber compositions were each subjected to pressing cure, based on an optimum cure time tc(90) calculated using a curastometer (160° C.), to obtain a 2 mm thick rubber sheet.

[Evaluation of Rubber Compositions]

The rubber sheets obtained from the respective rubber compositions of Examples 1-7 and Comparative Examples 1-7 were each subjected to a tensile test and measured for permanent compression set, abrasion resistance and slip resistance in accordance with the procedures described below.

1. Tensile Test

Measurement of 300% modulus (value obtained by dividing a stress at 300% elongation by a sectional area) at 23° C. was carried out using a Schopper tensile tester in accordance with the procedure specified in JIS K 6251.

2. Permanent Compression Set

In accordance with the procedure specified in JIS K 6262, a large-size test piece was compressed by 25% and maintained in the compressed condition for 24 hours. After the lapse of 24 hours, the test piece was released from an external force, allowed to stand for 30 minutes and then measured for thickness. The result was shown according to JIS K 6262, 5.5.

3. Abrasion Resistance

Abrasion loss was measured using an Akron abrader, manufactured by Shimadzu corporation, under the conditions of a load of 6 pounds, an angle of 15 degrees, with a preliminary abrasion of 200 times and a final abrasion of 1,000 times.

4. Slip Resistance

A test piece (30×20×2 mm) was placed on a PVC plate and a weight of 6 g was attached to an upper portion of the test piece. An inclination angle of the PVC plate was gradually increased. The inclination angle at which the test piece started to slide was recorded as an angle of slip to evaluate slip resistance.

5. Heat Build-Up Resistance

In accordance with the procedure specified in JIS K 6265, a temperature build-up from an initial temperature 40° C. and a permanent set were measured using a flexometer. A 17.80 mm diameter and 25.0 mm high, cylindrical test piece was used. A static compressive stress of 1 MPa was applied thereto with 1,800 cycles per minute and 4.45 mm stroke. A temperature build-up (Δt) after the lapse of 25 minutes was measured.

Evaluation results are shown in Tables 1 and 2.

TABLE 1

| | Curing Active Ingredient | | | Example | | | | | Comparative Example | | | | |
|---|---|---|---|---|---|---|---|---|---|---|---|---|---|
| | Content (wt %) | Form | | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
| Silica | | Powder | [p.b.w.] | 50 | 43 | 50 | 50 | 48.2 | 50 | 50 | 50 | — | 50 |
| Calcium Carbonate Treated With Curing Active Ingredient A | 1 | Powder | [p.b.w.] | — | — | — | — | — | — | — | 100 | 100 | — |
| Calcium Carbonate Treated With Curing Active Ingredient B | 10 | Powder | [p.b.w.] | 10 | 10 | — | — | — | — | — | — | — | — |

TABLE 1-continued

|  | Curing Active Ingredient Content (wt %) | Form |  | Ex. 1 | Ex. 2 | Ex. 3 | Ex. 4 | Ex. 5 | Comp. Ex. 1 | Comp. Ex. 2 | Comp. Ex. 3 | Comp. Ex. 4 | Comp. Ex. 5 |
|---|---|---|---|---|---|---|---|---|---|---|---|---|---|
| Calcium Carbonate Treated With Curing Active Ingredient C | 20 | Powder | [p.b.w.] | — | — | 5 | — | — | — | — | — | — | — |
| Calcium Carbonate Treated With Curing Active Ingredient D | 30 | Powder | [p.b.w.] | — | — | — | 3.3 | 3.3 | — | — | — | — | — |
| Calcium Carbonate Treated With Curing Active Ingredient + Silica E | 50 | Powder | [p.b.w.] | — | — | — | — | — | — | 2 | — | — | — |
| Calcium Carbonate Treated With Curing Active Ingredient F | 50 | Paste | [p.b.w.] | — | — | — | — | — | — | — | — | — | 2 |
| Curing Active Ingredient (100% conc.) | — | Liquid | [p.b.w.] | — | — | — | — | — | 1 | — | — | — | — |
| 160° C. Pressing Cure |  |  | [min] | 5 | 5 | 5 | 5 | 5 | 5 | 5 | Failed Mixing | 5 | 5 |
| 300% Modulus |  |  | [MPa] | 13.4 | 10.5 | 11.0 | 12.1 | 11.0 | 10.6 | 11.6 |  | 7.4 | 11 |
| Permanent Compression Set |  |  | [%] | 42.2 | 41.6 | 43.0 | 45.0 | 44.2 | 48.4 | 48.1 |  | 65.4 | 48.5 |
| Abrasion Resistance |  |  | [cc] | 0.02 | 0.04 | 0.03 | 0.02 | 0.02 | 0.03 | 0.02 |  | 0.21 | 0.03 |
| Slip Resistance |  |  | [Degree] | 37 | 41 | 40 | 30 | 33 | 26 | 28 |  | 47 | 27 |
| Workability During Metering And Mixing |  |  |  | ○ | ○ | ○ | ○ | ○ | x | ○ | x | ○ | x |

As can be clearly seen from Table 1, the calcium carbonates treated with curing active ingredient of Examples 1-5 in accordance with the present invention are in powder form and metered more easily compared to those of Comparative Examples 1 and 5. Also, they exhibit good workability and processability during mixing and, when incorporated in rubber, can improve slip resistance and permanent compression set without adversely affecting modulus and abrasion resistance.

In Comparative Example 2, a mixture of the modified calcium carbonate and silica at a 90:10 ratio by weight was mixed with the curing active ingredient such that the latter was brought to a content of 50% by weight. However, the resultant shows no appreciable improving effect on permanent compression set and slip resistance.

In Comparative Example 3, the curing active ingredient content was rendered to 1% by weight. The increased contents of silica and calcium carbonate made them difficult to mix in rubber.

The calcium carbonate treated with curing active ingredient of Comparative Example 4, in which the curing active ingredient was contained in the amount of 1% by weight, exhibits good slip resistance but shows marked deterioration of abrasion resistance.

The calcium carbonate treated with curing active ingredient of Comparative Example 5, in which the curing active ingredient was contained in the amount of 50% by weight, was unable to sustain a powder form and rendered into a paste form. This significantly lowers processability thereof during the metering and mixing in rubber. Also, it shows no appreciable improving effect on abrasion resistance and slip resistance.

TABLE 2

|  | Curing Active Ingredient Content (wt %) | Form |  | Ex. 6 | Ex. 7 | Comp. Ex. 6 | Comp. Ex. 7 |
|---|---|---|---|---|---|---|---|
| Silica |  | Powder | [p.b.w.] | 14.8 | 40.8 | 46 | 50 |
| Calcium Carbonate Treated With Curing Active Ingredient B | 10 | Powder | [p.b.w.] | 50 | — | — | — |
| Calcium Carbonate Treated With Curing Active Ingredient D | 30 | Powder | [p.b.w.] | — | 16.7 | — | — |
| Calcium Carbonate Treated With Curing Active Ingredient + Silica E | 50 | Powder | [p.b.w.] | — | — | 10 | — |
| Curing Active Ingredient (100% conc.) | — | Liquid | [p.b.w.] | — | — | — | 5 |
| 160° C. Pressing Cure |  |  | [min] | 30 | 30 | 30 | 30 |
| 300% Modulus |  |  | [MPa] | 8.7 | 8.4 | 8.1 | 8.1 |
| Permanent Compression Set |  |  | [%] | 32.0 | 33.0 | 40.5 | 42.5 |
| Heat Build-up Resistance |  |  | [cc] | 12 | 14 | 15 | 21 |
| Workability During Metering And Mixing |  |  |  | ○ | ○ | ○ | x |

As can be clearly seen from Table 2, calcium carbonates treated with curing active ingredient of Examples 6 and 7 in accordance with the present invention are in powder form and metered more easily compared to that of Comparative Example 7. Also, they exhibit good workability and processability during the mixing and, when incorporated in rubber, can improve heat build-up resistance and permanent compression set without lowering modulus.

In Comparative Example 6, a mixture of the modified calcium carbonate and silica at a 90:10 ratio by weight was mixed with the curing active ingredient such that the latter was brought to a content of 50% by weight. The resultant exhibits good heat build-up resistance but shows no remarkable improving effect on permanent compression set.

As can be appreciated from the above, the calcium carbonate treated with curing active ingredient of the present invention can be easily metered, exhibits good workability and processability during mixing in rubber and, when incorporated in rubber, imparts thereto good modulus, abrasion resistance, slip resistance and heat build-up resistance.

The calcium carbonate treated with curing active ingredient of the present invention can be expected to be applied to such rubber products as shoe soles, tires and belts.

The invention claimed is:

1. A rubber composition obtained by incorporating a calcium carbonate treated with a curing active ingredient, a silicic acid and a silicic acid salt in rubber, wherein the calcium carbonate treated with a curing active ingredient is obtained by mixing a curing active ingredient in liquid form at ambient temperature with modified calcium carbonate having a surface treated with a fatty or resin acid and a silicic acid and having a mean primary particle size of 0.01-0.5 μm such that the curing active ingredient content is brought to 9.1-30% by weight.

2. The rubber composition as recited in claim 1, wherein said curing active ingredient is at least one selected from the group consisting of organosilane, organotitanate and organoaluminate compounds.

3. The rubber composition as recited in claim 1, wherein the silicic acid and silicic acid salt are incorporated in the amount of 0.1-100 parts by weight, based on 100 parts by weight of the rubber component.

4. The rubber composition as recited in claim 1, wherein the calcium carbonate treated with a curing active ingredient is contained such that the curing active ingredient is brought to 0.1-20 parts by weight, based on 100 parts by weight of the rubber component.

5. The rubber composition as recited in claim 2, wherein the silicic acid and silicic acid salt are incorporated in the amount of 0.1-100 parts by weight, based on 100 parts by weight of the rubber component.

6. The rubber composition as recited in claim 3, wherein the calcium carbonate treated with a curing active ingredient is contained such that the curing active ingredient is brought to 0.1-20 parts by weight, based on 100 parts by weight of the rubber component.

7. The rubber composition as recited in claim 5, wherein the calcium carbonate treated with a curing active ingredient is contained such that the curing active ingredient is brought to 0.1-20 parts by weight, based on 100 parts by weight of the rubber component.

* * * * *